UNITED STATES PATENT OFFICE.

JOHN THOMAS NORMAN, OF ST. LIZIER, HENLEY-UPON-THAMES, ENGLAND.

COMPOSITION FOR CEMENTING OR JOINING MATERIALS OR ARTICLES.

949,493.

Specification of Letters Patent. Patented Feb. 15, 1910.

No Drawing. Application filed July 11, 1908. Serial No. 443,091.

*To all whom it may concern:*

Be it known that I, JOHN THOMAS NORMAN, a subject of the King of Great Britain, residing at St. Lizier, Henley-upon-Thames, in the county of Oxford, England, have invented certain new and useful Improvements in Composition for Cementing or Joining Materials or Articles, of which the following is a specification.

This invention relates to an improved quick setting composition applicable for use in holding or cementing together pieces of material such as porcelain, earthenware, marble, glass, metal, wood and other substances or articles made therefrom.

A composition adapted to effect the purposes above mentioned and compounded according to the present invention is composed of sodium silicate, china clay, barium sulfate and water in suitable proportions to render the mass of the consistency of thick cream; a mucilaginous agent in sufficient quantity is desirable in order to maintain the mixture in a state of homogeneity, but not to add to its adhesive property.

For the purpose of the present invention, the china clay and heavy spar may be employed either in a raw or a calcined condition and may be mixed with sodium silicate and water in such proportions as will produce a mixture of thick cream-like consistency. It is found that this mixture is liable to separate out into its constituents owing to the different specific gravities of the latter and thus the homogeneity of the composition as well as its efficiency as a holding or cementing medium is impaired. A mucilaginous agent is therefore added in just sufficient quantity to prevent such separation and to maintain the homogeneity of the composition. Such agent may be a vegetable gum such as tragacanth, or aluminium hydrate may serve the same purpose. The sodium silicate may be used either in a liquid or semi-solid state, and such of the other ingredients as may require to be ground are reduced to a fine state of subdivision and mixed, together with the water and the sodium silicate by means of an appropriate contrivance.

As the resultant cream-like composition hardens on exposure to air, it is therefore necessary to store it in such a way that the air cannot have access to it. This can readily be effected by storing the composition in collapsible tubes or similar receptacles so that portions of the said composition can be forced out as required, without permitting the remainder to be exposed to the air.

The materials and the proportions thereof which have yielded satisfactory results in practice are as follows:—China clay 20 parts, barium sulfate (heavy-spar) 43 parts, sodium silicate 34 parts, vegetable gum (tragacanth) 0.03 part, water 3 parts. These proportions are based on the assumption that the ingredients china clay and barium sulfate are in a dry condition. It will therefore be understood that in the event of these ingredients containing more or less moisture a certain allowance will have to be made in the use of the liquid for effecting the mixture of the ingredients. In this connection it may be stated that sodium silicate of a density of 75° Tweddle is best adapted for the purpose of the present invention.

If desired suitable pigments may be added to the above described mixture to afford a color thereto.

What I claim and desire to secure by Letters Patent of the United States is:—

1. As a liquid cement for joining materials or articles, the combination of the ingredients sodium silicate, china clay, barium sulfate, water and a mucilaginous agent.

2. As a liquid cement for joining materials or articles, the combination of the ingredients sodium silicate 34 parts, china clay 20 parts, barium sulfate 43 parts, water 3 parts, gum tragacanth 0.03 part.

3. As a liquid cement for joining materials or articles, the combination of sodium silicate, china clay, barium sulfate, water and gum tragacanth, whereby the ingredients are held in suspension.

In testimony whereof I affix my signature in presence of two witnesses.

JOHN THOMAS NORMAN.

Witnesses:
T. SELBY WARDLE,
WALTER J. S. MERTEN.